(12) United States Patent
Bruno et al.

(10) Patent No.: US 7,069,728 B2
(45) Date of Patent: Jul. 4, 2006

(54) MULTI-POSITION BOV ACTUATOR

(75) Inventors: Vittorio Bruno, Mississauga (CA); Salvatore Calandra, Montreal (CA)

(73) Assignee: Pratt & Whitney Canada Corp., Longueuil (CA)

(*) Notice: Subject to any disclaimer, the term of this patent is extended or adjusted under 35 U.S.C. 154(b) by 162 days.

(21) Appl. No.: 10/628,574

(22) Filed: Jul. 29, 2003

(65) Prior Publication Data
US 2005/0050900 A1   Mar. 10, 2005

(51) Int. Cl.
*F02C 6/04* (2006.01)

(52) U.S. Cl. .................. 60/785; 60/782; 60/795; 415/145

(58) Field of Classification Search .......... 60/779, 60/782, 785, 795, 39.091, 39.1; 415/145, 415/28; 92/13; 91/394, 402, 357, 19, 454; 251/35
See application file for complete search history.

(56) References Cited

U.S. PATENT DOCUMENTS

| | | | |
|---|---|---|---|
| 1,365,112 A * | 1/1921 | Line ................ 303/6.01 |
| 1,884,531 A * | 10/1932 | Bentley ............ 188/153 R |
| 2,732,125 A * | 1/1956 | Ruby ................ 415/27 |
| 2,834,182 A * | 5/1958 | Culbertson .......... 60/242 |
| 2,837,269 A * | 6/1958 | Torell .............. 415/27 |
| 2,863,601 A * | 12/1958 | Torell .............. 415/49 |
| 3,006,145 A * | 10/1961 | Sobey ............... 60/795 |
| 3,091,080 A * | 5/1963 | Crim et al. ......... 60/238 |
| 3,176,714 A * | 4/1965 | Smith et al. ........ 137/596.16 |
| 3,180,088 A * | 4/1965 | Swain .............. 60/39.25 |
| 3,246,572 A * | 4/1966 | Ogilvie ............. 91/48 |
| 3,270,507 A * | 9/1966 | Mercier et al. ...... 60/403 |
| 3,472,125 A * | 10/1969 | Noble .............. 91/47 |
| 3,477,344 A * | 11/1969 | Fisher ............. 91/52 |
| 3,487,993 A * | 1/1970 | Rannenberg ......... 415/28 |
| 3,500,753 A * | 3/1970 | Greene, Jr. ........ 417/403 |
| 3,505,002 A * | 4/1970 | Hinton, Jr. et al. .. 8/194 |
| 3,525,212 A * | 8/1970 | Gallant ............ 60/387 |
| 3,527,141 A * | 9/1970 | Peoples ............ 91/184 |
| 3,528,339 A * | 9/1970 | Darnell ............ 91/26 |
| 3,538,814 A * | 11/1970 | Fisher ............. 91/39 |
| 3,552,883 A * | 1/1971 | Weatherbee ......... 417/76 |
| 3,646,753 A * | 3/1972 | Colman et al. ...... 60/39.27 |
| 3,719,047 A * | 3/1973 | Briotet et al. ..... 60/239 |
| 3,739,165 A * | 6/1973 | Esken .............. 235/201 FS |
| 3,848,636 A | 11/1974 | McCombs |
| 3,849,020 A | 11/1974 | Eastman |
| 3,909,152 A * | 9/1975 | Rannenberg ......... 415/27 |
| 3,913,448 A * | 10/1975 | Priestley et al. ... 91/36 |
| 3,924,960 A * | 12/1975 | Harner et al. ...... 415/28 |
| 3,938,549 A | 2/1976 | Nunneley |
| 4,014,248 A * | 3/1977 | Cyrot .............. 91/19 |
| 4,083,290 A | 4/1978 | Andres |
| RE29,667 E | 6/1978 | Harner |
| 4,201,044 A * | 5/1980 | Dodd ............... 60/39.091 |
| RE30,329 E | 7/1980 | Rutshtein et al. |

(Continued)

FOREIGN PATENT DOCUMENTS

EP    0 045 228 A1    2/1982

(Continued)

*Primary Examiner*—William Rodriguez
(74) *Attorney, Agent, or Firm*—Ogilvy Renault

(57) ABSTRACT

A multi-position pressurized fluid actuator is mounted for movement in a casing. The actuator includes at least one selectively openable opening at a location corresponding to an intermediate position through which pressurized fluid can be selectively bled from the actuator to permit the actuator to remain in the intermediate position.

23 Claims, 2 Drawing Sheets

U.S. PATENT DOCUMENTS

| | | | |
|---|---|---|---|
| 4,391,092 A | * | 7/1983 | Arnett .......................... 60/795 |
| 4,506,594 A | * | 3/1985 | Rowland et al. .............. 454/74 |
| 4,568,058 A | | 2/1986 | Shelton |
| 4,702,070 A | * | 10/1987 | Cureton et al. ............... 60/785 |
| 4,815,285 A | | 3/1989 | Martin |
| 5,067,323 A | | 11/1991 | Bennett et al. |
| 5,159,808 A | * | 11/1992 | Kast ........................ 60/39.091 |
| 5,216,877 A | | 6/1993 | Moore, Jr. |
| 5,247,872 A | | 9/1993 | Hoshi |
| 5,381,654 A | * | 1/1995 | Halin ........................ 60/226.2 |
| 5,953,901 A | * | 9/1999 | Sidiropoulos ............ 60/39.091 |
| 6,122,905 A | | 9/2000 | Liu |
| 6,178,748 B1 | | 1/2001 | Oleksiewicz |
| 2002/0070368 A1 | * | 6/2002 | Rountree et al. ........ 251/30.01 |

FOREIGN PATENT DOCUMENTS

| | | |
|---|---|---|
| EP | 0 350 053 B1 | 7/1989 |
| EP | 1 054 164 A2 | 11/2000 |
| EP | 1 054 164 A3 | 11/2000 |
| JP | 8 074808 | 3/1996 |

\* cited by examiner

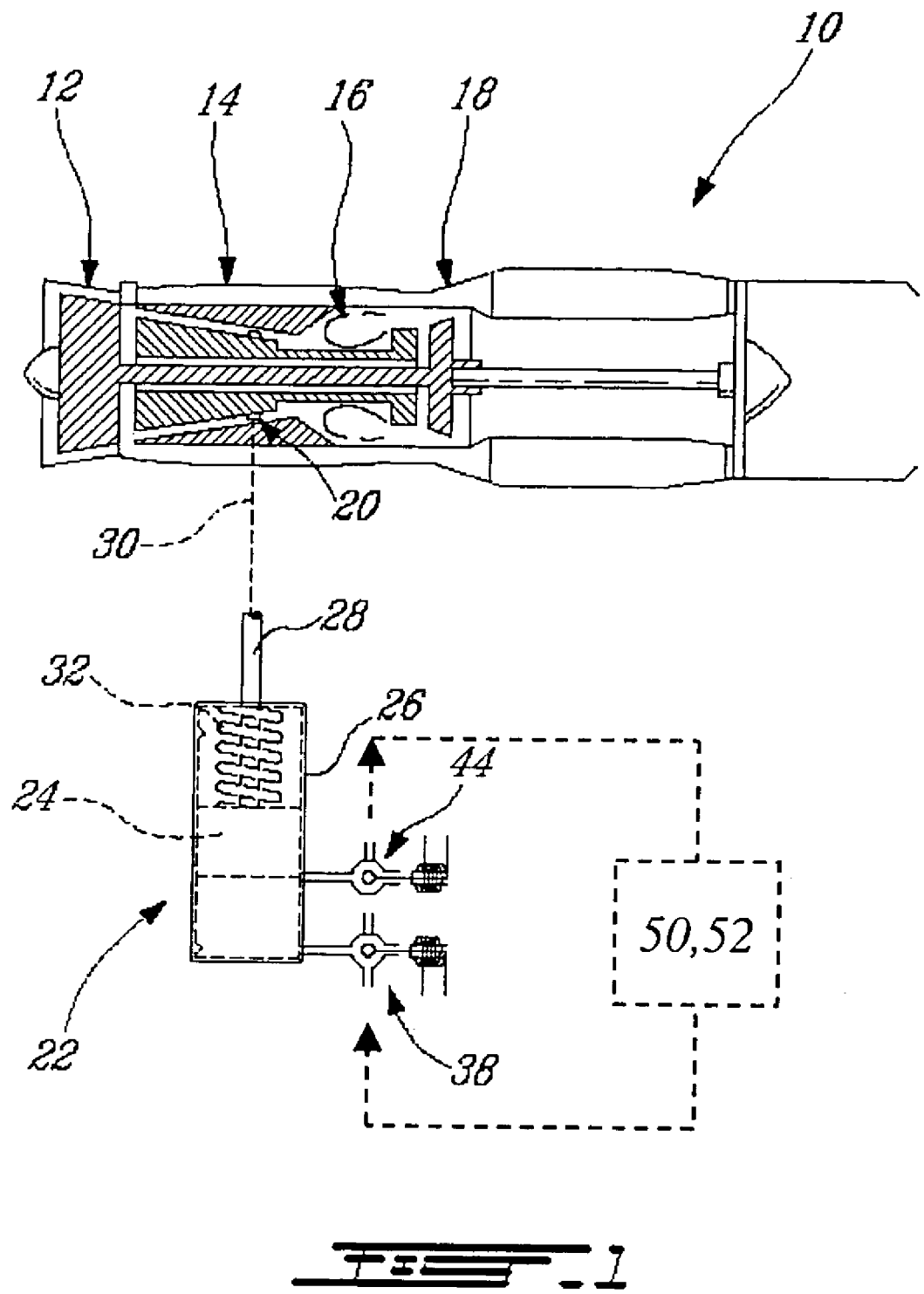

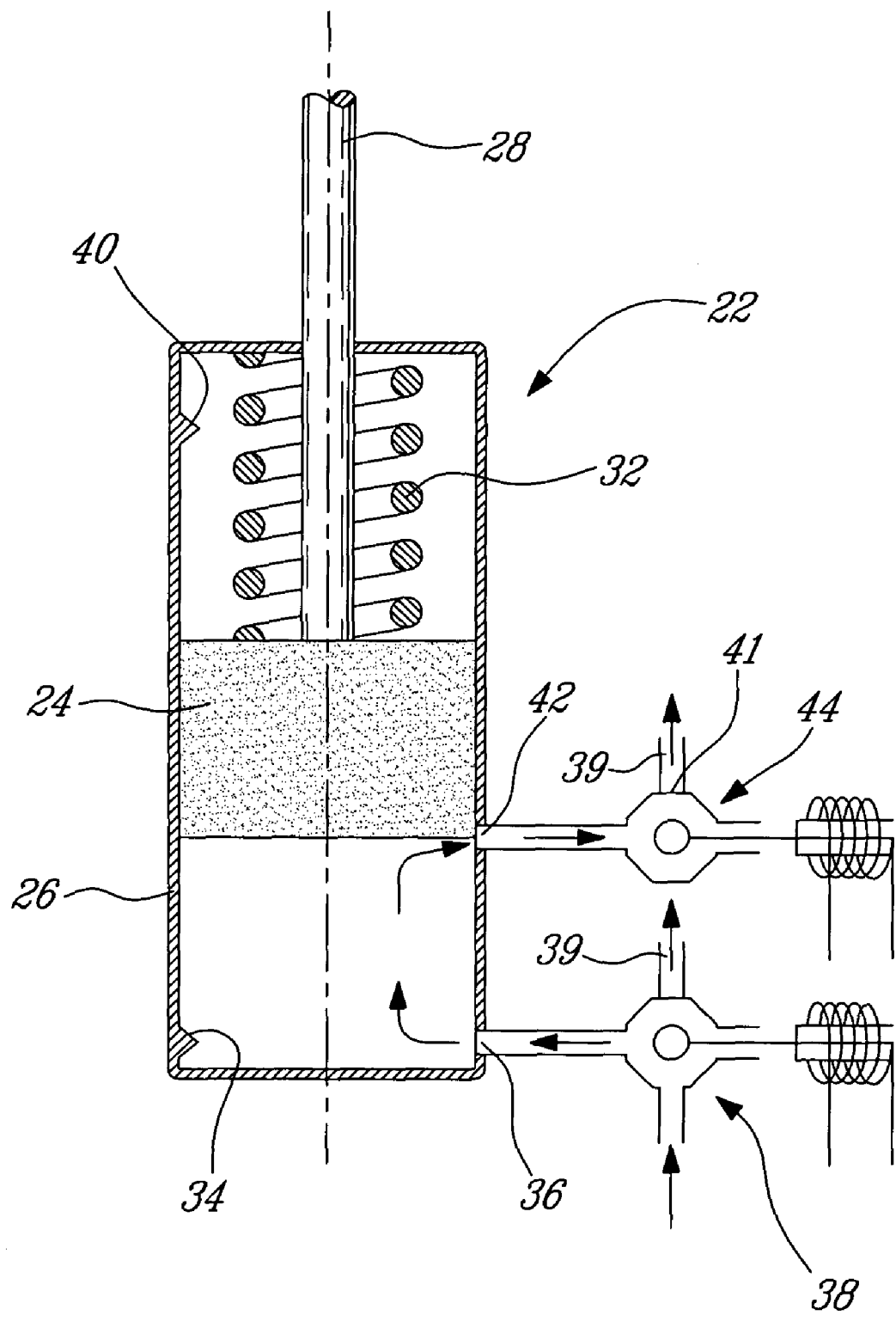

MULTI-POSITION BOV ACTUATOR

BACKGROUND OF THE INVENTION

1. Field of the Invention

The present invention generally relates to compressor surge bleed valve (BOV) actuators for gas turbine engines.

2. Description of the Prior Art

Compressor surge bleed valves are a well known method to protect against compressor surge. Accurately controlling bleed allows the engine performance to be controlled to prevent surge. Most prior art BOVs are two-position (open/closed) type, but variable position BOVs are also known, as exemplified by U.S. Pat. No. 3,849,020 issued to Eastman on Nov. 19, 1974 and U.S. Pat. No. 4,391,092 issued to Arnett on Jul. 5, 1983. Such variable position BOV systems generally include actuators which are complex in manufacture and operation requiring numerous parts which are subject to failure and which are responsive to complex signals relying on numerous compressor feedback measurements for achieving discrete positioning of the bleed valves to intermediate positions.

There is thus a need for a new compressor bleed valve actuator which is comparatively less complex structurally, less expensive to manufacture, more reliable, lighter in weight and which provides for intermediate bleed-off flow without the added complexity of compressor feedback measurement.

SUMMARY OF THE INVENTION

It is therefore an aim the present invention to provide a compressor bleed valve actuator which is of improved construction.

Therefore, in accordance with the present invention, there is provided a compressor bleed valve actuator comprising a movable piston in a piston casing, the piston being movable to a predetermined axial position set by a relief port which is selectively openable for allowing incoming pressurized fluid to flow out of said piston casing as said piston uncovers said relief port.

In accordance with a further general aspect of the present invention, there is provided a system for controlling compressor surge in a gas turbine engine comprising: at least one bleed valve; and at least one pressurized fluid actuator coupled to the bleed valve to operate the bleed valve to control compressor surge, said actuator mounted for movement in a casing between first, second and third positions, the second position being intermediate the first and third positions, wherein the actuator is moved between said positions upon the supply of a pressurized fluid to an operative portion of the actuator, the actuator having at least one selectively openable opening at a location corresponding to the second position for selectively permitting pressurized fluid to exit the operative portion of the actuator and thereby permit the actuator to remain in said second position.

In accordance with a still further general aspect of the present invention, there is provided a gas turbine engine comprising an engine part movable between discrete positions, an actuator coupled to said engine part to actuate the engine part, said actuator comprising a piston mounted for reciprocal movement within a piston casing, said piston being movable from a first end position to a second end position when a pressurized fluid is supplied to a chamber through a first opening defined in said casing, said chamber being defined at least partially by said piston and said piston casing, the actuator including a second opening adapted to remove pressurized fluid from said chamber, wherein said piston is selectively retainable in an intermediate position by bleeding pressurized fluid from said chamber through the second opening.

In accordance with a still further general aspect of the present invention, there is provided a compressor bleed valve actuator comprising a piston slidable in a piston casing between first, second and third positions, said second position being intermediate said first and third positions, a first port provided in said piston casing for allowing a pressurized fluid to be selectively supplied into said piston casing in order to displace said piston from said first position to said third position, and a selectively openable outlet port provided in said piston casing at a location corresponding to said second position, whereby when said piston uncovers said outlet port and said outlet port is opened, the pressurized fluid flowing into said piston casing via said first port is permitted to flow out of said piston casing through said outlet port, thereby causing said piston to remain in said second position thereof.

In accordance with a still further general aspect of the present invention, there is provided a method of setting an intermediate position of a compressor surge bleed control actuator, the actuator including a fluidly movable piston received in a casing for sliding movement between first, second and third positions, the second position being intermediate the first and third positions, the method comprising the steps of: biasing said piston towards said first position; directing a pressurized fluid into said casing via a first port to displace said piston away from said first position; and opening a relief port to permit pressurized fluid to flow out of said casing at said second position once said piston uncovers said relief port.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a schematic view illustrating an air bleed control system for a gas turbine engine utilizing a multi-position actuator constructed in accordance with a preferred embodiment of the present invention; and FIG. 2 is a schematic cross-sectional side view of the actuator used in the system illustrated in FIG. 1.

DESCRIPTION OF THE PREFERRED EMBODIMENTS

Referring to FIG. 1, numeral 10 designates a gas turbine engine generally comprising in serial flow communication a fan 12 through which ambient air is propelled, a compressor 14 for pressurizing the air, a combustor 16 in which the compressed air is mixed with fuel and ignited for generating a stream of hot combustion gases, and a turbine 18 for extracting energy from the combustion gases.

A series of conventional compressor air bleed valves 20 are provided to bleed compressor pressurized air from an intermediate or rear compressor stage to a relatively low pressure zone in order to prevent compressor surge to occur at off-design speeds.

A BOV actuator 22 is provided to accurately and simply actuate the bleed valves 20 to three positions (open, closed and intermediate). As best shown in FIG. 2, the actuator 22 generally comprises a piston 24 mounted for reciprocating movement within a piston casing or cylinder 26. An actuator rod 28 is connected to the piston 24 and extends axially outwardly of the cylinder 26 to displace the bleed valves 20 via an appropriate linkage, or other means, as is schematically represented at 30 (FIG. 1). Alternatively, each air bleed valve 20 could be individually actuated by a separate actuator 22.

A spring 32 is mounted between the piston and the cylinder, and preferably about the actuator rod 28 within the cylinder 26, to bias the piston 24 towards a first end or retracted position, and against a first stop 34 in the cylinder 26. This first end position in this example corresponds to the fully closed position of the air bleed valves 20. A first port 36 is defined preferably at or near the bottom of the cylinder 26 and is connected in this example to a conventional three-way solenoid valve 38 operable to selectively connect the cylinder 26 to a source of fluid pressure 50, such as a fuel tank, and to a return line 39 to form a fluid pressure circuit 52. Accordingly, a pressurized fluid can be directed into the cylinder 26 in order to displace the piston 24 against the biasing force of the spring 32 towards a second end or fully expanded position, in this example corresponding to the fully open position of the air bleed valves 20. A second stop 40 is preferably provided at the upper end of the cylinder 26 in order to limit the upward stroke of the piston 24 and, thus, stop the piston 24.

An intermediate relief port 42 is defined in the cylinder 26 at a location intermediate the first and second end positions described above. A in this example, a conventional two-way solenoid valve 44 is provided for selectively closing and opening the intermediate relief port 42. The fluid system return line 39 is connected to an outlet port 41 of the two-way solenoid valve 44 to feed the fluid back to the fluid reservoir (not shown). The solenoids are connected to an appropriate control system. When fluid is directed into the cylinder 26 via the first port 36, the piston 24 will be forced, when a sufficient fluid pressure is presented, to slide away from the first stop 34 against the biasing action of the spring and thus move towards the second stop 40. If it is desired to stop and maintain the piston 24 in an intermediate position, i.e. in this example between the first and second stops 34 and 40, the two-way valve 44 is operated to open the relief port 42. In this way, as soon as the piston 24 clears (i.e. uncovers) the relief port 42, the fluid supplied into the cylinder 26 via port 36 will flow out of the cylinder 26 through the relief port 42, thereby maintaining a stable pressure applied against the piston, but ceasing to force an upward movement of the piston. The continued counter-balance force exerted by the spring thereby co-operates to causes the piston 24 to remain in the intermediate position. As mentioned, and will be understood, the intermediate position of the piston is determined by the location of the relief port 42 for a given actuator design. (Likewise, the location of supply port 36 may be used to locate the first end position, assuming a sufficient pressure is maintained in the fluid supply line to overcome the biasing force of the spring, as the skilled reader will understand.) The intermediate position of the piston 24 preferably corresponds to some intermediate position of the air bleed valves 20, thus permitting an intermediate surge-control response to be made. If the intermediate relief port is closed, fluid cannot exit the cylinder chamber.

In use, a pressurized fluid is supplied from a pressurized fluid source, such as fuel tank 50 via fluid circuit 52 (see FIG. 1), to valve 38. When it is desired to actuate the actuator (e.g. to open surge control bleed valves on a compressor), valve 38 is operated to permit pressurized fluid to enter the cylinder, and thereby force piston 24 upwardly against the biasing force of spring 32. If it is desired to maintain the actuator in the intermediate position, the valve 41 is opened to permit pressurized fluid to exit the cylinder via port 32 (fluid thus circulates into the cylinder via valve 38 and out via valve 41, and a sufficient pressure is maintained to at least overcome the force of the biasing spring.) If it is desired to move the actuator to a third, full-span position, valve 41 is then closed (or remains closed, as the case may be) and the pressurized fluid in the cylinder forces the piston further upward in the cylinder, until stop 40 restrains further movement. In the event that the fluid pressure falls to lower than the spring biasing force (e.g. if the fluid pressure is decreased at source, or by the action of valves 38 and/or 41), the piston 24 will move downwardly under the action of the spring 32 until a pressure balance or the stop 34 is reached. If valve 41 is opened while piston is positioned between port 42 and stop 40, pressurized fluid in the cylinder will be permitted to exit via port 42, thereby affecting the pressure in the cylinder and preferably sufficiently so as to permit the piston to move towards stop 34. However, as the piston reaches relief port 42 the fluid pressure underneath the piston 24 will preferably "automatically" return the piston 24 to its intermediate position should the piston move to a position blocking port 42. Therefore, as long as the valve 41 remains open and a sufficient fluid pressure is maintained in the cylinder to just overcome the spring force, the piston 24 will remain steady in its intermediate position. Should valve 39 then be closed such that fluid is not supplied to the cylinder, the position will tend to return under the action of the spring to stop 34.

The utilization of a so-called "mid-span" relief port advantageously obviates the need for feedback measurements in order to achieve accurate intermediate positioning. The intermediate position of the actuator 22 is established for a given actuator design by the position of the relief port 42 on the cylinder 26, and thus is a predetermined fixed position that is only dictated by the position of the relief port 42. It is understood that additional relief ports could be provided along the cylinder 26 in order to move the piston 24 to any number of discrete intermediate positions between the stops 34 and 40. Furthermore, it will be understood that the use of stops 34 and 40, and spring 32 is optional. Alternate counter-balance force(s) may be employed in place of or to supplement spring 32.

One skilled in the art may, therefore, in light of the disclosure and teachings herein modify the embodiments presented above as exemplary of the present invention to provide still further embodiments of the present invention. For example, although the use of a piston-type fluidic actuator is preferred, the use of other hydraulic or pneumatic actuators may be similarly used. Although the actuator 22 shown in the drawings is vertically oriented, it is understood that the actuator 22 could have a different orientation. The valves 38 and 44 need not be solenoid, or 2-way or 3-way configurations, but only be selectively openeable when appropriate. The ports 36 and 42 need not be ports in the typical sense, but may be any suitable means for permitting the access and/or exit of fluid. Also, it is also understood that the present invention of course contemplates various types of actuators, including fluidly movable pistons, such as hydraulic and pneumatic pistons, as well as other non-piston actuators. The actuator 22 could also be used to perform stator vane or nozzle positioning, exhaust or exit or other nozzle positioning, as well as positioning of other gas turbine engine control members. The invention may be advantageously applied to air bleed systems of a variety of prior art or novel configurations. The invention may also be applied to any gas turbine type, and as well to any system in which surge control is desirable or having a need for a simple and cost-effective discrete positioning apparatus. The present invention may be used with a constant-pressure fluid supply, or may be used with a variable-pressure system, in which actuator position is controlled alternately by the present invention and other means, such as pressure balancing.

The main advantages of the above-described actuator are its simplicity and its ability to permit the disposal of the requirement for feedback to achieve an intermediate position. Other benefits of the invention may be summarized as low cost, reliable, lightweight and compact.

The invention claimed is:

1. A compressor bleed valve system comprising at least one bleed valve, and an actuator having a movable piston in a piston casing, the piston being operatively coupled to the bleed valve, the piston being movable to a predetermined axial position set by a relief port which is selectively openable for allowing incoming pressurized fluid to flow out of said piston casing as said piston uncovers said relief port, the predetermined axial position of the piston corresponding to an axial location of the relief port in the piston casing between longitudinally opposed ends thereof.

2. A compressor bleed valve system as defined in claim 1, wherein said piston casing has first and second opposed end portions, and wherein said relief port is provided at a location intermediate said first and second opposed end portions.

3. A compressor bleed valve system as defined in claim 1, wherein the piston is movable from one side of said relief port to an opposed side thereof when said relief port is closed.

4. A compressor bleed valve system as defined in claim 1, wherein a control port is provided at a first end portion of said piston casing, said control port being connected to a first valve operable for allowing pressurized fluid to flow into and out of the piston casing.

5. A compressor bleed valve system as defined in claim 4, wherein said control port and said relief port are in fluid flow communication via said piston casing when said piston uncovers said relief port.

6. A compressor bleed valve system as defined in claim 4, wherein said piston has a first face adapted to be exposed to fluid pressure, and wherein a first stop is provided in said casing to stop said piston in a first limit position in which said first face of said piston is spaced axially from said control port.

7. A compressor bleed valve system as defined in claim 6, wherein said piston is biased against said first stop.

8. A compressor bleed valve system as defined in claim 7, wherein said piston has a second face opposed to said first face thereof, and wherein a biasing member acts on said second face of said piston to bias said first face against said first stop.

9. A compressor bleed valve system as defined in claim 8, wherein said piston is displaceable under fluid pressure to a second limit position in which said second face thereof is pushed against a second stop provided within said piston casing.

10. A compressor bleed valve system as defined in claim 1, wherein stoppers are provided on either sides of the relief port to physically set to limit positions of the piston.

11. A system for controlling compressor surge in a gas turbine engine comprising: at least one bleed valve; and at least one pressurized fluid actuator coupled to the bleed valve to operate the bleed valve to control compressor surge, said actuator mounted for movement in a casing between first, second and third positions, to second position being intermediate the first and third positions, wherein the actuator is moved between said positions upon the supply of a pressurized fluid to an operative portion of the actuator, the actuator having at least one selectively openable opening at a location corresponding to the second position for selectively permitting pressurized fluid to exit the operative portion of the actuator and thereby permit the actuator to remain in said second position.

12. A system as defined in claim 11, wherein the actuator is a piston and the casing is a cylinder.

13. A system as defined in claim 11, wherein a portion of the actuator obstructs the opening when the actuator is into first position.

14. A system as defined in claim 11, further comprising a biasing apparatus adapted to bias the actuator towards the first position, wherein the biasing apparatus is adapted to exert a biasing force on the actuator in a direct opposite to a force exerted by pressurized fluid in said operative portion, and wherein the biasing force is less than the pressurized fluid force.

15. A system as defined in claim 12, wherein the first position is defined by a second selectively openable opening on the actuator.

16. A system as defined in claim 15, wherein the openable openings are in fluid flow communication via the operative portion when the actuator is in the second position.

17. In a gas turbine engine comprising an engine part movable between discrete positions, an actuator coupled to said engine part to actuate the engine part, said actuator comprising a piston mounted for reciprocal movement within a piston casing, said piston being movable from a first end position to a second end position when a pressurized fluid is supplied to a chamber through a first opening defined in said casing, said chamber being defined at least partially by said piston and said piston casing, the actuator including a second opening adapted to remove pressurized fluid from said chamber, wherein said piston is selectively retainable in an intermediate position by bleeding pressurized fluid from said chamber trough the second opening.

18. An actuator as defined in claim 17, wherein the position of the second opening corresponds to the intermediate position.

19. An actuator as defined in claim 17 further comprises plurality of axially spaced-apart second openings along the piston stroke to permit selective retention of the piston in a plurality of spaced-apart intermediate positions corresponding to the locations of the spaced-apart second openings.

20. A compressor bleed valve system comprising a bleed valve operated by an actuator having a piston slidable in a piston casing between first, second and third positions, said second position being intermediate said first and third positions, a first port provided in said piston casing for allowing a pressurized fluid to be selectively supplied into said piston casing in order to displace said piston from said first position to said third position, and a selectively openable outlet port provided in said piston casing at a location corresponding to said second position, whereby when said piston uncovers said outlet port and said outlet port is opened, the pressurized fluid flowing into said piston casing via said first port is permitted to flow out of said piston casing through said outlet port, thereby causing said piston to remain in said second position thereof.

21. A compressor bleed valve system as defined in claim 20, wherein said first port and said outlet port are in fluid flow communication via said piston casing when said piston uncovers said outlet port.

22. A compressor bleed valve system as defined in claim 20, wherein the pressurized fluid is fuel.

23. A method of setting an intermediate position of a compressor surge bleed valve via the operation of a compressor surge bleed control actuator, the actuator including a fluidly movable piston received in a casing for sliding movement between first, second and third positions, the second position being intermediate the first and third positions, the method comprising the steps of: operatively connecting the compressor surge bleed valve to the actuator; biasing said piston towards said first position; directing a pressurized fluid into said casing via a first port to displace said piston away from said first position; and opening a relief port to permit pressurized fluid to flow out of said casing at said second position once said piston uncovers said relief port.

* * * * *

UNITED STATES PATENT AND TRADEMARK OFFICE
CERTIFICATE OF CORRECTION

PATENT NO. : 7,069,728 B2 Page 1 of 1
APPLICATION NO. : 10/628574
DATED : July 4, 2006
INVENTOR(S) : Vittorio Bruno and Salvatore Calandra It is certified that error appears in the above-identified patent and that said Letters Patent is hereby corrected as shown below:

In the claims:

column 6, line 15, delete "into" and insert --in the--

Signed and Sealed this

Twenty-ninth Day of August, 2006

JON W. DUDAS
*Director of the United States Patent and Trademark Office*